United States Patent
Cheriton

(10) Patent No.: US 9,262,135 B2
(45) Date of Patent: *Feb. 16, 2016

(54) INTERPRETER-BASED PROGRAM LANGUAGE TRANSLATOR USING EMBEDDED INTERPRETER TYPES AND VARIABLES

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,204

(22) Filed: Jun. 20, 2014

(65) Prior Publication Data

US 2015/0012912 A1  Jan. 8, 2015

Related U.S. Application Data

(63) Continuation of application No. 12/383,732, filed on Mar. 27, 2009, now Pat. No. 8,799,877.

(51) Int. Cl.
*G06F 9/45* (2006.01)
*G06F 9/455* (2006.01)

(52) U.S. Cl.
CPC ......... *G06F 8/40* (2013.01); *G06F 8/423* (2013.01); *G06F 8/427* (2013.01); *G06F 9/45508* (2013.01); *G06F 9/45504* (2013.01)

(58) Field of Classification Search
None
See application file for complete search history.

(56) References Cited

U.S. PATENT DOCUMENTS

| | | | | |
|---|---|---|---|---|
| 5,864,862 | A * | 1/1999 | Kriens et al. | |
| 6,138,269 | A * | 10/2000 | Ball et al. | 717/108 |
| 6,314,562 | B1 * | 11/2001 | Biggerstaff | 717/156 |
| 6,760,905 | B1 * | 7/2004 | Hostetter et al. | 717/148 |
| 6,910,206 | B1 * | 6/2005 | Nevill | 717/153 |
| 7,210,130 | B2 * | 4/2007 | Fairweather | 717/136 |
| 7,278,137 | B1 * | 10/2007 | Fuhler et al. | 717/153 |
| 7,681,186 | B2 * | 3/2010 | Chang et al. | 717/143 |
| 7,725,883 | B1 * | 5/2010 | Nylander et al. | 717/139 |
| 7,774,746 | B2 * | 8/2010 | Mansfield et al. | 717/106 |
| 7,945,904 | B2 * | 5/2011 | Meijer et al. | 717/140 |
| 7,992,140 | B2 * | 8/2011 | Meijer et al. | 717/140 |
| 8,065,668 | B2 * | 11/2011 | Bosworth et al. | 717/141 |
| 8,079,037 | B2 * | 12/2011 | Lui et al. | 719/310 |
| 8,201,139 | B2 * | 6/2012 | Chang et al. | 717/104 |
| 2003/0066056 | A1 * | 4/2003 | Petersen et al. | 717/137 |
| 2003/0188297 | A1 * | 10/2003 | Vion-Dury et al. | 717/141 |
| 2004/0006765 | A1 * | 1/2004 | Goldman | 717/116 |
| 2004/0216094 | A1 * | 10/2004 | Bosworth et al. | 717/141 |
| 2005/0055680 | A1 * | 3/2005 | Kluger et al. | 717/143 |
| 2005/0216896 | A1 * | 9/2005 | Doleh | 717/136 |
| 2006/0048095 | A1 * | 3/2006 | Meijer et al. | 717/114 |
| 2006/0080647 | A1 * | 4/2006 | Bhansali et al. | 717/148 |
| 2006/0117302 | A1 * | 6/2006 | Mercer et al. | 717/131 |
| 2006/0123403 | A1 * | 6/2006 | Bruecklmayr et al. | 717/136 |
| 2006/0130025 | A1 * | 6/2006 | Walpole | 717/141 |
| 2006/0130038 | A1 * | 6/2006 | Claussen et al. | 717/168 |
| 2006/0195829 | A1 * | 8/2006 | Vincent | 717/141 |

(Continued)

*Primary Examiner* — Isaac T Tecklu

(74) *Attorney, Agent, or Firm* — Van Pelt, Yi & James LLP

(57) ABSTRACT

A programming language is extended to have embedded interpretive types (EIT) that define objects and variables to be resolved at translation time. A variable or data element having a type that is one of the EITs is referred to as an embedded interpretive variable (EIV). A control construct containing an EIV is interpreted (i.e. executed) at translation time.

17 Claims, 1 Drawing Sheet

(56) References Cited

U.S. PATENT DOCUMENTS

| | | | |
|---|---|---|---|
| 2006/0212847 A1* | 9/2006 | Tarditi et al. | 717/117 |
| 2007/0028223 A1* | 2/2007 | Meijer et al. | 717/140 |
| 2007/0074185 A1* | 3/2007 | Meijer et al. | 717/140 |
| 2007/0174823 A1* | 7/2007 | Snover et al. | 717/139 |
| 2007/0256060 A1* | 11/2007 | Ryu et al. | 717/140 |
| 2008/0022264 A1* | 1/2008 | Macklem et al. | 717/136 |
| 2008/0033968 A1* | 2/2008 | Quan et al. | 707/100 |
| 2008/0141222 A1* | 6/2008 | Alpern | 717/125 |
| 2008/0209394 A1* | 8/2008 | Andersen et al. | 717/114 |
| 2008/0247532 A1* | 10/2008 | Schulz | 379/220.01 |
| 2008/0263063 A1* | 10/2008 | Sceppa et al. | 707/100 |
| 2008/0301644 A1* | 12/2008 | Drepper | 717/124 |
| 2008/0320444 A1* | 12/2008 | Meijer et al. | 717/110 |
| 2008/0320453 A1* | 12/2008 | Meijer et al. | 717/140 |
| 2009/0077543 A1* | 3/2009 | Siskind et al. | 717/136 |
| 2009/0119651 A1* | 5/2009 | Slattery | 717/145 |
| 2009/0122062 A1* | 5/2009 | Kilpatrick | 345/426 |
| 2009/0328013 A1* | 12/2009 | Aharoni et al. | 717/140 |
| 2010/0077384 A1* | 3/2010 | Ostrovsky et al. | 717/127 |
| 2010/0153912 A1* | 6/2010 | Porras et al. | 717/106 |
| 2010/0169868 A1* | 7/2010 | Condit et al. | 717/136 |

* cited by examiner

```
type Switch : Object {
  for(Interp::Int i=0;i<=numPorts;++i) {
    Interp::AttrName attrname = pnp+i;
    if(i==numPorts) {
       Interp::AttrName cpuname = "cpuport";
       CpuPort cpuname(attrname,i,this);
    }
    else PortType attrname(attrname,i,this);
  }
}
```

102 →

EIT/EIV evaluation at translation time

```
class Switch : public Object {
public:
   EthPort * port0() const { return port0_; }
   ...
private:
   EthPort* port0_;
   EthPort* port1_;
   EthPort* port2_;
   EthPort* port3_;
   CpuPort * cpuPort_;
};
```

104 →

```
Switch::Switch():
   port0_(new EthPort("port0",0,this),
   port1_(new EthPort("port1",1,this),
   port2_(new EthPort("port2",2,this),
   port3_(new EthPort("port3",3,this),
   cpuport_(new CpuPort("cpuport",4,this),
   {
   }
```

106 → remainder of translation run time

INTERPRETER-BASED PROGRAM LANGUAGE TRANSLATOR USING EMBEDDED INTERPRETER TYPES AND VARIABLES

This application is a continuation of co-pending U.S. patent application Ser. No. 12/383,732, entitled INTERPRETER-BASED PROGRAM LANGUAGE TRANSLATOR USING EMBEDDED INTERPRETER TYPES AND VARIABLES filed Mar. 27, 2009 which is incorporated herein by reference for all purposes.

FIELD OF THE INVENTION

This invention relates to automatic translation of programming languages.

BACKGROUND

The basic model of a programming language is a set of symbols specified according to a grammar which is parsed and translated into an executable form according to semantic rules of the language. In this form, a language is "literal" in the sense that each input construct references to a specific construct in the output representation. That is, a procedure specification produces an executable procedure specification and a struct or type or class specification produces a memory template (set of offsets) for accessing elements of the struct, type or class in memory.

Various ways exist to avoid repeated specification and to recognize common processing sequences and data structures. In particular a common subprocessing sequence that occurs in multiple locations can be replaced by calls to a common subroutine that performs that common processing sequence. A common subexpression occurring in multiple expressions can also be factored out as an expression that assigns to a local variable or as a separate function that returns the value of the subexpression. Similarly, common data structures can be specified in a common type/class or struct specification, with data members specified by this common type. Object-oriented languages allow commonality between different types to be recognized and specified using a base type from which these different types inherit, effectively sharing base type data member and member function definitions and implementation.

However, logical commonality can arise that includes differences that cannot be handled by these sharing mechanisms. In particular, two specifications of a data structure implementation can be the same except for the type of the object to be stored in this data structure. For example, two implementations of a hash table may differ only in the type of object that each can store. Similarly, a processing sequence may be the same for two different computing platforms, differing only in the name of a constant being passed to a call.

It is possible to handle some such cases by performing actions at run-time, including automatic run-time checks. For example, a constant can be changed to a variable with this variable having a value automatically set at run-time according to the target platform. Similarly, a hash table can have a base type (possibly the so-called "void" base type pointer) and perform run-time checks of the types actually stored in the table to ensure type safety. However, this approach incurs the risk of only discovering problems at run-time. It also incurs the cost of performing run-time checks for aspects that are actually known at translation time, and thus are logically unnecessary. Finally, for some cases such as Verilog generation and embedded software, it may not be feasible to perform run-time checks. For example, a router implementation may require N implementations of a Port module, each differing slightly according to system parameters, but instantiated statically at translation time, not at run-time.

One early approach to these problems was to add a so-called macro preprocessor that (pre)processes the language input and then invokes the language translator itself on the resulting transformed input. This macro processor allows constructs to be specified that are recognized by the macroprocessor, causing it to modify the input source as a textual transformation. For example the C/C++ preprocessor is such a macroprocessor, providing named constants, macros (inline procedures), conditional compilation and file inclusion. However, this approach has several problems in practice. In particular, textual transformations can produce illegal results and difficult error messages as well as introduce more subtle errors. It can also make software debugging difficult because the input source does not reflect exactly what is provided to the language translator proper.

More recently, type-parameterized types and procedures have been included in the language, so common code differing only in the types or constants used can be specified once, and then instantiated for each specific type. The C++ template mechanism is an example. However, a C++ typename has no semantic properties. It is just a type parameter that binds to a class. In particular, instantiation of C++ types can lead to errors that are only discovered at link time, not by the translator. C# and Java generics are similar except they allow for specification of some constraints or invariants for these parameters.

Another approach is to support redefinition of basic language constructs within the language, which is often referred to as meta-programming. For example, the language can allow a programmer to specify a revised definition of basic operators such as the function call operator. However, this approach effectively creates a new language, making it difficult for other programmers to understand the software. It also does not address key practical requirements such as conditional compilation, file inclusion, etc.

Accordingly, it would be an advance in the art to provide mechanisms for handling logical commonality at translation time that provide an improved combination of generality and ease of use relative to conventional approaches.

SUMMARY

In the present approach, a programming language is extended to have embedded interpretive types (EIT) that define objects and variables to be resolved at translation time. A variable or data element having a type that is one of the EITs is referred to as an embedded interpretive variable (EIV). A control construct containing an EIV is interpreted (i.e. executed) at translation time.

To better appreciate the significance of this approach, it is helpful to consider the conventional definition of "types" in relation to computer programming languages. Conventionally, a type is defined as a tag or indication on a data element of a programming language that indicates: a) the allowed range of values for the data element; and b) the allowed operations/operators for the data element. For example, an integer data type may have an allowed range from −32,768 to 32,767 and have allowed operations including arithmetic operators such as +, −, *, and /. As another example, a string data type can be defined as an array of bytes that represent characters according to a character encoding, and have allowed operations such as concatenation, substring extraction, etc. Attempting to perform arithmetic on strings (or concatenation of integers) gives rise to a type mismatch error that is easily caught at translation time, which is significantly helpful in practice.

Another way to appreciate the significance of the present approach is to compare and contrast this approach with conventional approaches, such as macro pre-processing and the use of templates, e.g., as in C++. Macro text substitution is inherently a "type-unaware" process. For example, if a parameter named "xyz" is set to a specific value (e.g., 20) by text substitution, no type checking is (or can be) done during text substitution. Thus, text substitution could introduce a type error if a variable "xyz" is declared to have a type other than an integer.

Similarly, template metaprogramming also does not rely on templates being types, or on type checking of template parameters prior to template instantiation. A template is a pattern from which code can be generated by instantiation, and it is the elements of the code provided by template instantiation that have types (or can be types). A template supports a form of staged interpretation by the compiler where a class template provides a deferred or staged specification of a parameterized type. (Partial) template specialization provides a means to implement selection and looping (in terms of recursion), thereby providing a complete language facility. C++ template programming effectively computes with types, using recursion and specialization for loops (and terminating loops) and nested enum values to effectively specify a value. However, the programming can be tricky, inefficient and lead to non-obvious error messages. Furthermore, templates themselves are not types because a template does not determine which operators are legally applicable to the template, and does not determine an allowed range for the template.

The present work can be regarded as based on an extension of the conventional concept of type. Accordingly, from this point forward, a type is defined as a tag or indication on a data element of a programming language that indicates: a) the allowed range of values for the data element; b) the allowed operations/operators for the data element; and c) whether the data element is to be evaluated at run time or at translation time. Types that are evaluated at translation time are the EITs referred to above.

The use of types to determine which constructs are evaluated at translation time provides several significant advantages.

First, aspects that are not determined or determinable at design time but are known at translation time can be resolved to a literal/static representation, allowing translation time checking and avoiding the overhead of runtime binding. In particular, static instantiation is supported.

Second, by operating "inside the language translator" during translation-time evaluation, the translator has access to symbols of the language, allowing use of defined constants, and access to other objects, such as collections of types, attributes and constraints. This allows syntactic and semantic problems to be identified more readily.

Third, because EITs are restricted to syntactic elements of the language, the resulting code can be more readily understood by other programmers, and compatibility with externally compiled modules can be ensured. Also, no further complication to the language grammar is required, because each EIV construct uses the same grammar. For example, the meaning of an assignment statement such as a:=b+c does not depend on whether or not a, b, and c are EIVs that are evaluated at translation time.

Automatic program translation according to the above-described principles can proceed as follows. An input computer program can be provided in an input computer language, where the input computer language provides two sets of data types. The first set of types are for language elements or constructs to be evaluated at run time (i.e., conventional types). The second set of types are for language elements or constructs to be evaluated during translation (i.e., EITs). The input computer program includes at least one element or construct having a type in the first set of types, and at least one element or construct having a type in the second set of types. During automatic translation, any elements or constructs in the input computer program having a type in the second set (i.e., the EIVs having EIT types) are evaluated. A computer executable representation of the automatically translated input computer program is provided as an output (e.g., as executable machine code).

Preferably, the input computer language has a predetermined and fixed grammar, such that the semantic meaning of a language construct does not depend on whether the type of the construct is in the first or second sets of data types.

In an embodiment, an interpreter is embedded within a compiler, where the embedded interpreter takes care of the translation time evaluation of EIVs. The terms "embedded interpretive type" and "embedded interpretive variable" follow from this possibility.

In some embodiments, the compiler includes a definitional input module (DIM) that has the property of treating each name in its input stream as literal by default. The DIM can invoke the embedded interpreter during translation of EIT type constructs. Ordinarily, the translator interprets a symbol (e.g., cat) as a variable name to evaluate, and additional syntax (e.g., quotes as in "cat") is required to force the translator to regard the symbol as a literal (i.e., the string literal "cat"). However, in the DIM, the default is instead to interpret unquoted symbols (e.g., cat) as being the corresponding literals (e.g., "cat"), instead of being a variable name to evaluate. The DIM and embedded interpreter can invoke each other recursively.

In some cases, the above-described automatic translation can include translating the input computer program to an intermediate representation having only constructs to be evaluated at run time. This intermediate representation can be a high level (i.e., human readable) language or a low level (i.e., machine readable) language.

During program translation, it is not necessary to ensure that all EIVs be expressed in terms of quantities previously defined in the input stream to the translator. By providing EIT constructs that provide for deferred instantiation, it is possible to define EIVs in terms of quantities to be defined later on during translation. One approach for providing such deferred instantiation is to provide templates for EIT/EIV constructs, which can be instantiated later on during translation time processing.

The full range of control constructs can be made available for use with EIT constructs, including but not limited to "if-then", "if-then-else", "for", "do-while", and "switch-case".

An example of the flexibility provided by the EIT/EIV approach is the following approach for static operator overloading. The operators of the input computer language can be assigned EIT types, and translation time evaluation of these operators can include determining the argument types provided to the operators, and providing a version of the operator having input argument types consistent with the argument types actually provided. In this manner, run-type type checking is avoided, and there is no need for a programmer to type check every instance of the operator in the input program.

BRIEF DESCRIPTION OF THE DRAWINGS

FIG. 1 shows an example of translation-time evaluation.

DETAILED DESCRIPTION

As indicated above, EITs provide the ability to designate "variables" in the source code input that are (and must be) resolved at translation time, allowing translation-time selection of constant values, code and declaration sequences and types, effectively parameterizing differences in similar software units, allowing them to be expressed in a common form.

Various kinds of EITs are of interest in practice. An EIT may correspond to a conventional type such as "integer" but indicating that it needs to be interpreted and thus of a determinable value at translation time. As another example, an EIT may correspond to the type of input stream for the translator. An EIT may correspond to a type of a node in the programming language grammar and one of its accessory types. For example, if the language includes a "type" construct, there can be an EIT corresponding to this type construct as well as one corresponding to the iterator type for iterating over the set of nested (sub)types.

In an embodiment, the translator can be structured to include an interpreter component that executes instructions on an internal representation (IR) of the program. These instructions include a means to query and modify this IR. For example, an embodiment may contain an interpreter instruction or command such as:

define type "Foo" from "Bar";

to define a new type named "Foo" that derives (or inherits) from an existing type "Bar". Thus, variables of this interpreter language refer to objects in the IR and name values are quoted literal values. EITs are types implemented by this interpreter that are embedded in the programming language processed by the translator, allowing interpretive processing to be specified and invoked from this programming language, whether it is compiled or interpreted.

In this example statement, the names "Foo" and "Bar" are quoted to indicate that they are literals, and a special "define" key word indicates that this is a definition relating to translation time evaluation, as opposed to being a normal program statement that is only translated (and not evaluated) at translation time. Preferably, translation according to the present approach makes use of a definitional input module, as described below, in order to more efficiently perform translation time evaluation.

Definitional Input Module Processing

The interpreter preferably supports an operation to read, parse and update the IR according to a specified input stream in the programming language syntax. This operation is implemented by the interpreter invoking a Definitional Input Module (DIM) that reads a specified input stream and updates the IR accordingly. Relative to the normal interpreter mode, this mode is, by default, in definitional mode and treats each name as literal by default, eliminating the need for quotes (as in the preceding example). Special syntactic values can be indicated by reserved keywords, as is well-known in the art.

In this DIM input mode, a program can be specified in a conventional programming language model in which names by default are literal and constructs are definitional or declarative. In contrast, using a more conventional general purpose interpreter approach (where a large number of definitions would be required) has the disadvantages of: a) syntactic clutter from quoting all the literal elements, such as type names, etc. as illustrated in the definition of "Foo" above; and b) keyword clutter from having to designate each definitional construct as such, as with the use of define above.

In an embodiment, a type node in the IR is flagged as being an EIT. Similarly, a variable that is declared as being of a type that is an EIT type is considered and flagged as an EIV. Thus, a EIV of a type in the IR is a variable for that construct, not a specific literal instance. In other words, a node can be a type variable, representing a type, which is bound to a literal type at some point during translation, as opposed to being a specific literal type name. For example, an EIV NType of type NumericType, where NumericType is an EIT, could be bound to a literal type name such as integer, float, double or complex during translation.

When the DIM encounters an EIV in a construct as part of parsing some input, it can write an indication of this construct to a predefined EIT object that is provided to it on invocation. This action invokes the interpreter to handle this construct. The interpreter processes this construct, possibly rewriting it and passing to (a new instance of) the DIM to process and then updating the predefined EIT object to indicate subsequent actions by the invoking DIM, if any.

This callback, triggered by encountering an EIV, provides a way to effectively embed structures to be handled by the interpreter in this programming language input, such as file inclusion (i.e. recursive import) and conditional translation.

In an embodiment, the DIM can also be invoked in template mode in which case it parses the input stream, accepting EITs and EIV that are not bound to specific values, and creates a deferred instantiation internal representation of the parsed construct (e.g., an EIT/EIV template), which can then be invoked later. In effect, this provides a macro capability for the embedded interpreter.

Consequently, the input form to the DIM does not need to deviate from the underlying language grammar in order to invoke the interpreter. Moreover, the DIM can be used to provide a concise form of macro capability to the interpreter. And, the EIT/EIV elements of the IR are available in a straight-forward way to the interpreter, given that they are elements of the same IR as used for the language itself.

EIT Specification

In an embodiment, the EITs can be specified in a reserved namespace such as Interp, the namespace of the interpreter. E.g.

Interp::String fileName="input.tac";

An EIV can then be defined in the parsed language representation by specifying it as being one of these types in this reserved namespace. In an embodiment, this namespace includes types corresponding to types in the translator IR grammar, associated iterators and accessory types, basic types such as strings, integers and also specialized types and predefined EIVs. For example, in an embodiment, Interp::translatorin corresponds to the input stream to the translator.

This approach takes advantage of the fact that a programming language is specified and realized as a language grammar which is specified in terms of non-terminal symbols that correspond to different language constructs, such as type or class, procedure, variable, expression, etc.

A type that is defined as a derived type of an EIT is also an EIT. It can be defined with additional operators, attributes and properties. In this case, a variable of this derived type EIT can only be assigned a literal or specific instance value that matches these requirements.

This facility provides the ability to state requirements on EITs and EIVs that occur in a template. It provides a superset of the capability provided by generics in Java and C# as well as the proposed "concept" mechanism in C++0X, but without the special syntax and associated limitations.

Prior art on translator extensibility has proposed a dichotomy between externalizing the internal representation to allow the specification of extensions, as with LISP, versus using the external representation as a basis for extensions of the grammar, as used with Xoc. In the present approach, the internal representation types can be embedded in the external representation (i.e. the programming language grammar), achieving the best of both prior art approaches.

Interpreter Structure

In an embodiment, the interpreter includes a parser that translates textual interpretive input into an internal so-called byte code that is executed by a byte-code interpreter. This byte-code interpreter approach employs techniques that are well-known in the art. It allows modular separation of language parsing and error checking from execution of the input as well as efficient execution of statements that are executed more times than input, such as those specified in an iterative statement such as a "for" loop.

In this interpreter structure, there are byte codes for the usual operations on variables, the conventional control statements and for defining types and data elements in the IR.

Preferably, the interpreter also supports the definition and instantiation of "listener objects" that are invoked in response to specified objects changing. These specified objects include EIT instances, including predefined EITs.

DIM Operation

The DIM can operate as follows:

a) when a language construct is encountered that includes a EIV, the construct is written to an EIT object, which causes a program in the interpreter to be invoked.

b) the interpreter program executes the internal code associated with the construct, possibly reinvoking the DIM, and returning from this execution to the invoking DIM execution as soon as the newly invoked DIM reaches the end of this input.

Here, the interpreter has access to the IR (and thus all the symbols) of the program parsed so far. Moreover, symbol table elements are effectively flagged as being literal or a EIT variable as described earlier. The following several sections discuss specific functionality in more detail.

Preferably, the parser handles certain simple constructs containing EIVs rather than invoking the embedded interpreter. For example, use of wild card characters such as ? and * in a name can be handled by the parser as opposed to invoking the embedded interpreter to evaluate the wild cards to provide a list of matches.

File Inclusion

File inclusion can be handled by a statement that specifies an EIV corresponding to the translator input stream, e.g.

translatorIn<<"filename";

Here, translatorIn is a pre-defined EIV that corresponds to the translator input stream. The file could also be specified as a EIV and must then be bound to a particular constant string at this time. It can also be a normal named constant string as above.

The DIM, in response to encountering the above statement, writes an EIT object with this construct, invoking the corresponding interpreter program which causes the interpreter to access the specified file and invoke a new instance of the DIM with this input file, then waiting for this new instance to complete before resuming the invoking DIM.

Conditional Compilation/Translation

Conditional compilation can be handled by the interpreter evaluating the test condition of the "if" statement and then passing the tokens in the "true" portion through to the DIM. In particular, the DIM parses the "if" statement and then, upon determining that the test expression depends on a EIV, invokes the embedded interpreter. The interpreter determines the value of the test expression and then reads the tokens of the input, passing those in the "true" portion through to be parsed and discarding the rest. In one embodiment, the DIM effectively pushes a "if cond then" onto the interpreter stack in this case and invokes the interpreter.

Iterative Generation

A "for" loop can be handled by the interpreter executing the for-loop, instantiating the specified number of instances of tokens, replacing the EIV variable corresponding to the loop variable with its definition on each iteration through the for-loop. Here, the for loop either uses a loop variable that is a EIV or an iterator object of an EIT type.

Template Definition and Instantiation

With a parameterized type definition, the interpreter can invoke the DIM to define a template object in the internal representation. With parameterized type instantiation, the interpreter can be invoked to replace each type variable with its definition.

Embedded Interpretive Operators

In an embodiment, each operator symbol is treated as designating an embedded interpretive object that is bound to a specific procedure based on the types and collective properties of the arguments, which may only be known at compile time, based on determination of the types of these arguments. This can be regarded as an extension of conventional operator overloading. For example, consider an operator f(a,b) having arguments a and b. Conventional operator overloading is based on selecting f during translation according to the types of a and b as given prior to translation. In the present approach, the types of a and/or b can be computed during translation (i.e., these types can themselves be EIVs), and then f can be selected according to the types of a and b as computed during translation.

Extended Processing

In an embodiment, various listener types of objects are automatically generated to handle dynamic probes, logging, remote access and other capabilities. Each facility or extension is specified as an interpreter program that is executed by the translator interpreter. In effect, an interpreter program that listens to events during translation and is invoked to take action, such as defining a corresponding (nested) type in response to a new type definition. A listener is also able to iterate over the internal object model, generating accessory types and procedures as needed for the specific facility.

Conventionally a separate tool is required to provide each such facility with the attendant overhead and programming complexity. In another conventional approach, each such extension is explicitly coded into the translator program. The above-described simplicity of the present approach is in sharp contrast to the complexity of these conventional alternatives.

EXAMPLE

To better appreciate the present approach, it is helpful to consider the following example.

Suppose that a network Switch has some number, numPorts, of ports to interface to wire links connecting it to the rest of the network. The value of numPorts is fixed once the software is compiled but may not be known at the time of the design of the software. Moreover, in some cases, it is desirable to have the names of the variables corresponding to the ports be statically assigned as "port0", "port1", and so on. Also, there is normally a distinguished port that corresponds to the connection to the CPU (central processing unit) controlling the switch. Moreover, different switches may have different type of ports, such as those handling the Ethernet protocol versus those handling the ATM protocol. Also, one may want to change the port name prefix "port" to another designation in some cases, e.g. "interface".

In an embodiment of the invention, the above can be specified as:

```
type Switch : Object {
    for(Interp::Int i=0;i<=numPorts;++i) {
        Interp::AttrName attrname = pnp+i;
        if(i==numPorts) {
            Interp::AttrName cpuname = "cpuport";
            CpuPort cpuname(attrname,i,this);
        }
        else PortType attrname(attrname,i,this);
    }
}
```

In the above example, CpuPort names a predefined type that take a name string, integer and (back) pointer to type Switch as parameters. PortType designates an EIV of type Interp::TypeName that is bound to a specific type at this point in the translation. Interp::Int and Interp::AttrName designate embedded interpreter types for an integer type and attribute name type, respectively. The numPorts variable is a predefined EIV of type Interp::Int. The pnp variable is a predefined EIV of type Interp::String, bound to the literal string "port". In this example, the translator translates input such as the above into a C++ like intermediate language as follows.

When the DIM encounters the above "for" statement, it recognizes the loop variable "i" as an EIV because of its declaration as being of type Interp::Int, an EIT. This recognition causes it to invoke the embedded interpreter module of the translator, providing an indication of the initial construct at issue, and its location in the input source.

The interpreter recognizes the "for" loop and checks that the associated EIVs can be evaluated at the present (translation) time. In particular, it determines that "i" can be evaluated in its initial value because the initial value is specified as a constant, namely the value 0. It also checks that the value of numPorts is known at this time, generating an error message otherwise. The value of numPorts could be specified by input to the translator when it was invoked, by a mechanism similar to the so-called environment variables provided in common computer operating systems such as Unix and Linux, or indirectly by its definition relative to another EIV. In this particular example, numPorts is assumed to be set to the value 4. Further, we assume that PortType EIV is bound to the EthPort type, which handles the Ethernet protocol. The EIV pnp is bound to the string "port".

The interpreter then proceeds to effectively execute this "for" loop. The statement Interp::AttrName attrname=pnp+i;

is recognized as defining a new attribute name formed from the EIV pnp which has the literal value "port" concatenated with the value of i. As is well-known in the art, the integer value of i is converted to the corresponding literal string to match the required type of the "+" operator, which is interpreted here as a string concatenation operator based on the first argument to this operator, pnp, being a character string. On the initial translation-time execution of this loop, the value of i is 0 so the value of the EIV attrname is "port0".

The next input line is recognized as an "if" statement whose test condition is evaluated based on the known values of i and numPorts, determining this test condition to be false, causing it to proceed to the "else" statement.

The "else" input line is parsed as a declaration of an attribute whose name is specified by the EIV attrname, with parameters of EIV attrname and i. Thus, the interpreter generates the corresponding declaration, replacing EIVs with their corresponding values. In particular, this line on the first iteration of the loop produces the EIV-free declaration:

EthPort port0("port0",0,this);

Note that the attrname value as a parameter is automatically translated to a literal string based on the parameter type of the Port type being of a String type.

The interpreter then recognizes the end of the loop and continues back at the "for" statement, incrementing the value of i, testing it against the value of numPorts and then executing the loop body again, this time with the value of i being 1. This subsequent execution of the loop body causes the interpreter to generate the EIV-free declaration:

EthPort port1 ("port1",1,this);

This process repeats for i being 2 and then 3. At the next execution of the loop, the interpreter recognizes that i is now equal to numPorts, causing it to execute the "if" statement, and thus generate the EIV declaration:

CpuPort cpuport("port4",4,this);

In the subsequent iteration of the loop, the interpreter recognizes that the value of i is no longer less than numPorts and terminates the execution of the loop. It also recognizes that the end of the "for" loop corresponds to the end of the language construct for which it was invoked to process. It therefore re-invokes the DIM to process the result it has generated, which is effectively:

```
EthPort port0("port0",0,this);
EthPort port1("port1", 1, this);
EthPort port2("port2",2,this);
EthPort port3("port3",3,this);
CpuPort cpuport("cpuport",4,this);
```

In an embodiment, the DIM generates each input type as a C++ class and each attribute declaration as a data member of that class. Consequently, the DIM generates the C++ like class declaration:

```
class Switch : public Object {
public:
    EthPort * port0( ) const { return port0_; }
    ...
private:
    EthPort* port0_;
    EthPort* port1_;
    EthPort* port2_;
    EthPort* port3_;
    CpuPort * cpuPort_;
};
```

Here, the convention is followed of having the data member be named for the attribute suffixed by the "_" character to distinguish from any corresponding member functions, such as the "port0( )" member function declared in the class. The portion designated " . . . " indicates additional declarations that may be part of this class declaration, along the lines of the single member function "port0" that provides access to the private data member "port0_".

In addition to the above, the DIM generates a C++ constructor for the Switch class that initializes these data members with an instance of the corresponding class, as follows:
Switch::Switch( )

```
port0__(new EthPort("port0",0,this),
port1__(new EthPort("port1",1,this),
port2__(new EthPort("port2",2,this),
port3__(new EthPort("port3",3,this),
cpuport__(new CpuPort("cpuport",4,this),
{
}
```

As illustrated in this example, the generated software can be caused to adapt to the number of ports required at translation time without changing the input source, based only on changing the definition of numPorts. It can also handle generating attributes with a different port type simply by changing the value bound to PortType at translation time. The port name prefix can be changed also by changing the definition of pnp to another string, e.g.

Interp::String pnp="intf";

Because the EIVs and EITs are part of the input grammar, the translator is able to perform normal syntax checking and provide informative error checking. For example, if the input source specified Interp::String pnp ".port";

because the programmer accidentally inserted a "." at the start of the literal string "port" and if this character was not allowed as part of a legal attribute name, the embedded interpreter would issue an error message specifically indicating that the generated ".port" name is not a legal attribute name when it encountered Interp::AttrName attrname=pnp+i;

This example also illustrates that the present approach can reduce the amount of input source that needs to be specified, even when the numPorts does not vary. Correspondingly, it allows the programmer to indicate in the input source a regularity in a repeated structure that is less evident in its expanded form. Moreover, if the attributes are indicated to be statically defined, the expanded version may also allow reduction in execution time overhead by generating the expanded static form, eliminating the need for its run-time generation.

The preceding considerations are summarized on FIG. 1. Here code 102 has its EIT/EIVs evaluated at translation time to produce code 104 and 106, which can then be translated and run.

Finally, the above example can be transformed into a template to allow deferred instantiation with specified parameters by qualifying the declaration with EIV parameters. For example, this example would be templatized as:

```
type SwitchTemplate(Interp::Port PortType,Interp: :Int
numPorts, Interp: :String
pnp) : Object {
    for(Interp::Int i=O;i<=numPorts;++i) {
    Interp: :AttrName attrname = pnp+i;
    if(i==numPorts)
        Interp::AttrName cpuname = "cpuport";
        CpuPort cpuname(attrname,i,this);
    }
    else PortType attrname(attrname,i,this);
    }
}
```

The EIVs PortType, numPorts and pnp within the parentheses following "SwitchTemplate" indicate this is a parameterized type declaration with these EIV as parameters. Thus, when the DIM encounters this type declaration, the occurrence of these EIV declarations causes it to invoke the interpreter, which recognizes these as not yet bound and defers the instantiation. A subsequent declaration of this type with specific parameters causes a specific type to be instantiated. For instance, the declaration:

Interp::Type pt=isEtherSwitch ? EthPort:AtmPort;
Interp::Int ports=3;
SwitchTemplate(pt,ports,"port") switch;

would cause the instantiation of a type comparable to the Switch type specified at the beginning of this example, assuming the EIV is EtherSwitch is true, together with a data element called "switch" of this type, This instantiated Switch type would be realized the same as described above, except that the three EIVs would be bound as part of this instantiation to the arguments "pt","ports" and "port" with which it was invoked.

Unlike the substitution capabilities provided by macroprocessors or the C++ template facility, both of which were added as after thoughts to languages, this capability uses the existing syntax of a language, relying on the type-tagging of an EIT to distinguish translation-time evaluation from runtime evaluation. Moreover, as a proper type in the language, one can pass strings such as "port" as well as expressions and have the appropriate type checking and conversions be applied. For example, the above could be rewritten to pass an expression, eliminating the EIV pt as:

SwitchTemplate(is EtherSwitch ? EthPort:
AtmPort,ports,"port") switch;

assuming "is EtherSwitch" is an EIV.

As this example illustrates, in the present approach, the normal grammar and the powerful constructs of a programming language can used to modify, qualify and expand generated software at translation time, using embedded interpretive types and their associated variables, invoking an interpreter to perform this elaboration at translation time.

The preceding description has focused on methods according to embodiments of the invention. Embodiments of the invention also include computer apparatus (i.e., systems) programmed to automatically execute the relevant methods, and computer readable media containing software instructions to perform the relevant methods. Such computer apparatus can be provided in any combination of hardware and/or software. Computer readable media includes mass storage media such as magnetic and optical media, and can be local (i.e., directly connected to a computer) or remote (i.e., connected to a computer by way of one or more networks).

The invention claimed is:

1. A method comprising:
providing an input computer program expressed in an input computer language, wherein:
the input computer language includes a first set of data types for elements or constructs to be evaluated at runtime, and a second set of data types for elements or constructs to be evaluated at translation time; and
the input computer program includes at least one element or construct having a type in the first set of data types and includes at least one element or construct having a type in the second set of data types, the second set of data types being designated as embedded interpreter types (EITs) using type tags or type indicators; and
automatically translating the input computer program to a computer executable output representation, including:
determining, at translation-time, whether a data type of a specific element or construct in the input computer program is among the first set of data types or the second set of data types, the determining includes recognizing whether the specific element or construct includes an EIT;

in the event that the data type of the specific element or construct does not include an EIT, and the data type of the specific element or construct is among the first set of data types, at translation-time, performing translation without evaluating the specific element or construct; and in the event that the data type of the specific element or construct includes an EIT and the specific element or construct is among the second set of data types, at translation-time, executing code pertaining to the specific element or construct to evaluate the specific element or construct and performing translation; and providing the computer executable output representation as an output.

2. The method of claim 1, wherein the input computer language has a predetermined and fixed grammar, and wherein a semantic meaning of a construct does not depend on whether the construct has a data type in the first set of data types or in the second set of data types.

3. The method of claim 1, wherein in the event that the data type of the specific element or construct is among the second set of data types, executing the code pertaining to the specific data is performed at translation-time_by an embedded interpreter included in a compiler.

4. The method of claim 3, wherein the compiler includes a definitional input module that treats each name in its input stream as a literal by default, and wherein the definitional input module invokes the embedded interpreter during translation of data having a data type in the second set of data types.

5. The method of claim 4, wherein the embedded interpreter and the definitional input module can recursively invoke each other.

6. The method of claim 1, wherein the automatically translating the input computer program to a computer executable output representation comprises translating the input computer program to an intermediate representation, and wherein the intermediate representation includes only constructs to be evaluated at run-time.

7. The method of claim 1, wherein the input computer program includes one or more elements or constructs of the input computer language having data types in the second set of data types that provide for deferred instantiation of corresponding data elements or structures during translation.

8. The method of claim 1, wherein the at least one element or construct having a data type in the second set of data types includes a control construct that is:
"if-then", "if-then-else", "for", "do-while", or "switch-case".

9. A system comprising:
one or more computer processors configured to:
provide an input computer program expressed in an input computer language, wherein:
the input computer language includes a first set of data types for elements or constructs to be evaluated at runtime, and a second set of data types for elements or constructs to be evaluated at translation time; and
the input computer program includes at least one element or construct having a type in the first set of data types and includes at least one element or construct having a type in the second set of data types, the second set of data types being designated as embedded interpreter types (EITs) using type tags or type indicators; and automatically translate the input computer program to a computer executable output representation, including to:
determine, at translation-time, whether a data type of a specific element or construct in the input computer program is among the first set of data types or the second set of data types, the determination includes to recognize whether the specific element or construct includes an EIT;

in the event that the data type of the specific element or construct does not include an EIT, and the data type of the specific element or construct is among the first set of data types, at translation-time, perform translation without evaluating the specific element or construct; and in the event that the data type of the specific element or construct includes an EIT and the specific element or construct is among the second set of data types, at translation-time, execute code pertaining to the specific element or construct to evaluate the specific element or construct and perform translation; and provide the computer executable output representation as an output.

10. The system of claim 9, wherein the input computer language has a predetermined and fixed grammar, and wherein a semantic meaning of a construct does not depend on whether the construct has a data type in the first set of data types or in the second set of data types.

11. The system of claim 9, wherein in the event that the data type of the specific element or construct is among the second set of data types, executing the code pertaining to the specific data is performed at translation-time_by an embedded interpreter included in a compiler.

12. The system of claim 11, wherein the compiler includes a definitional input module that treats each name in its input stream as a literal by default, and wherein the definitional input module invokes the embedded interpreter during translation of data having a data type in the second set of data types.

13. The system of claim 12, wherein the embedded interpreter and the definitional input module can recursively invoke each other.

14. The system of claim 9, wherein to automatically translate the input computer program to a computer executable output representation includes to translate the input computer program to an intermediate representation, and wherein the intermediate representation includes only constructs to be evaluated at run-time.

15. The system of claim 9, wherein the input computer program includes one or more elements or constructs of the input computer language having data types in the second set of data types that provide for deferred instantiation of corresponding data elements or structures during translation.

16. The system of claim 9, wherein the at least one element or construct having a data type in the second set of data types includes a control construct that is:
"if-then", "if-then-else", "for", "do-while", or "switch-case".

17. A computer program product being embodied in a non-transitory computer readable storage medium and comprising computer instructions for:
providing an input computer program expressed in an input computer language, wherein the input computer language includes a first set of data types for elements or constructs to be evaluated at runtime, and a second set of data types for elements or constructs to be evaluated at translation time; and the input computer program includes at least one element or construct having a type in the first set of data types and includes at least one element or construct having a type in the second set of data types, the second set of data types being designated as embedded interpreter types (EITs) using type tags or type indicators; and automatically translating the input computer program to a computer executable output representation, including:

determining, at translation-time, whether a data type of a specific element or construct in the input computer program is among the first set of data types or the second set of data types, the determining includes recognizing whether the specific element or construct includes an EIT;

in the event that the data type of the specific element or construct does not include an EIT, and the data type of the specific element or construct is among the first set of data types, at translation-time, performing translation without evaluating the specific element or construct; and in the event that the data type of the specific element or construct includes an EIT and the specific element or construct is among the second set of data types, at translation-time, executing code pertaining to the specific element or construct to evaluate the specific element or construct and performing translation; and providing the computer executable output representation as an output.

* * * * *